Nov. 15, 1927.

F. A. STEVENS 1,649,794

OPHTHALMIC MOUNTING

Original Filed Aug. 5, 1921

Inventor,
Frederick A. Stevens.
per David Rines
Attorney.

Patented Nov. 15, 1927.

1,649,794

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed August 5, 1921, Serial No. 489,947. Renewed November 5, 1925.

The present invention relates to ophthalmic mountings comprising non-metallic members, such as temples and lens-holding frames, that are connected together by metal hinges, and it has for its object to secure the hinges in place upon the non-metallic members in a new and improved manner.

In the accompanying drawings.

Figures 2, 3, 4, 5:
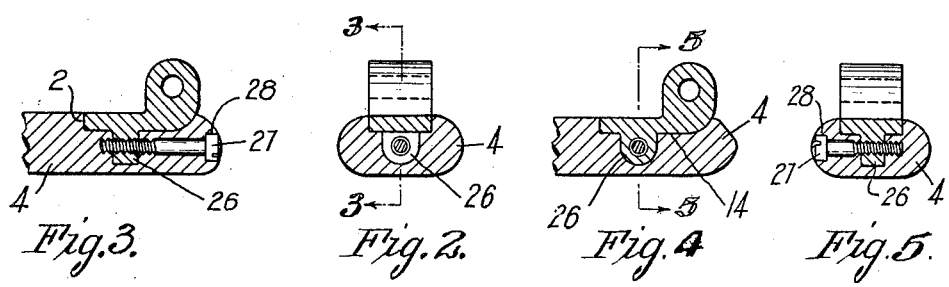
Figure 2 is a section taken upon the line 2—2 of Figure 1.
Figure 1:
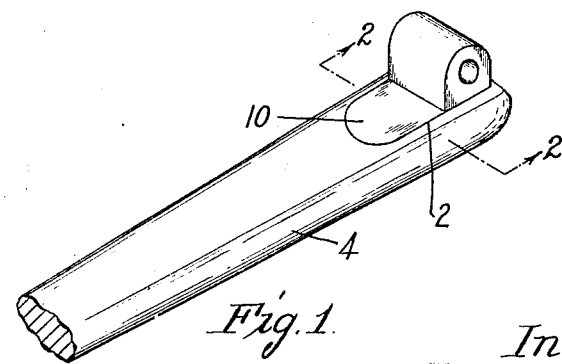
Figure 1 is a fragmentary view of a temple showing a hinge plate secured thereto according to the present invention.

Figure 3 is a longitudinal sectional view, taken upon the line 3—3 of Figure 2; and Figures 4 and 5 are views similar to Figures 3 respectively, of a modified temple, and 2, the section of Figure 5 being taken upon the line 5—5 of Figure 4.

In commercial ophthalmic mountings of the above-described character, the pivotally connected hinge plates of the metal hinges have hitherto been secured to the non-metallic members by pairs of rivets passing through the hinge plates and the members. These have not been fully satisfactory.

According to the present invention, the previously formed hinge-plate-receiving recess 2 of the non-metallic member, such as a temple 4, is provided with oppositely disposed, blunt walls and a substantially flat bottom wall 14. The walls of the hinge plate 10 in contact with the recess walls are correspondingly blunt, so that twisting or turning of the hinge plate within its groove is prevented. The base of the hinge plate is shown provided with oppositely disposed substantially flat sides 11 and 13. The side 13 rests in contact with the flat bottom wall 14 of the recess. To prevent the hinge plate falling transversely out of its recess, the hinge plate is integrally provided with a tapped ear or attachment member 26 that enters a previously formed groove in the bottom wall 14 of the recess 2, and a screw 27 or similar member that enters the non-metallic member at 28 is threaded through the ear to secure the hinge plate to the member. The ear 26 extends from the flat side 13 and is both of less width and less length than the body of the hinge plate, as shown, so as to form a circumferential shoulder at the junction 35 of the attachment member 26 and the base portion of the hinge plate.

The screw 27 may extend longitudinally of the member, Figures 2 and 3, or transversely, Figures 4 and 5; in the former case entering the non-metallic member at the end face, and in the latter, a side face. The hinge plate is provided with a knuckle 36 on the side 11 of the hinge plate opposite to the side 13 which carries the ear or attachment member 26. The recess 2 is open ended or not, as desired, but is in all cases positioned in a side face of the temple, near the end wall thereof, adjacent to the lens-holding frame (not shown).

The invention is not restricted to the exact embodiments thereof that are illustrated and described herein, but is subject to modification within the spirit and scope of the appended claims.

What is claimed as new is:

1. An ophthalmic mounting comprising a member constituted of non-metallic material having a recess in one face, the recess having a bottom wall that is provided with a groove, a hinge element lying in the recess having an ear lying in the groove, and means entering another face of the member and passing through the ear for securing the hinge element to the member.

2. In an ophthalmic mounting comprising two members adapted to be pivotally connected together by a hinge comprising a plurality of pivotally connected elements, one of the member having an end face adjacent to the other member and a side face the said one member having a recess in the side face, one of the hinge elements lying in the recess, and means entering the recessed member at the end face and passing through the said one hinge element for securing the hinge element to the member.

3. In an ophthalmic mounting comprising two members, one a lens-holding frame and the other a temple that is adapted to be connected to the frame by a hinge comprising a plurality of pivotally connected elements, one of the members having an end face adjacent to the other member and a recess adjacent to the end face, one of the hinge elements lying in the recess, and means entering the recessed member at the end face and passing through the said one hinge element for securing the hinge element to the member.

4. A spectacle temple comprising a member constituted of non-metallic material having a recess and an end face, the end face being adapted to be position adjacent to a lense-holding frame to which the temple is adapted to be hinged, a hinge element for hinging the temple to the frame lying in the recess, and means entering the member at the end face and passing through the hinge element for securing the hinge element to the member.

5. A spectacle temple comprising a member constituted of non-metallic material having side faces and an end face, a hinge element having a portion extending into the member through one of the side faces, and a securing element entering the member through the end face and extending through the said portion of the hinge element for securing the hinge element to the member.

6. An ophthalmic mounting comprising a non-metallic member having an open sided recess and a previously formed groove leading into the recess, and a hinge element lying in the recess having an attachment member lying in the groove, the hinge element having a knuckle, and the hinge element being secured to the non-metallic member.

7. An ophthalmic mounting as defined in claim 6 having means extending into the non-metallic member and the hinge element for securing the hinge element in position in the recess.

8. A hinge member comprising a base portion having oppositely disposed sides, one of the sides being substantially flat, the hinge member having an attachment member integrally extending from the said one side of the base portion and having a knuckle disposed on the other side of the base portion, the attachment member being of less length and width than the base portion and being so disposed as to form a circumferential shoulder at the junction of the attachment member and the base portion.

9. A hinge member comprising a plate-shaped base portion having oppositely disposed substantially flat sides, the hinge member having an attachment member integrally extending from one of the substantially flat sides of the base portion and having a knuckle disposed on the other substantially flat side of the base portion, the attachment member being of less length and width than the base portion and being so disposed as to form a circumferential shoulder at the junction of the attachment member and the base portion.

10. An article of the class described comprising a non-metal member provided with a substantially flat face, and a hinge member comprising a base portion having oppositely disposed sides, one of the sides being substantially flat, the hinge member having an attachment member integrally extending from the said one side of the base portion and having a knuckle disposed on the other side of the base portion, the attachment member being of less length and width than the base portion and being so disposed as to form a circumferential shoulder at the junction of the attachment member and the base portion, and the hinge member being mounted on the non-metal member with the said one side in contact with the said face, the non-metal member being provided with a groove in the said face within which groove the attachment member is received.

11. An ophthalmic mounting comprising a non-metallic member having a previously formed recess and a previously formed groove leading into the recess, and a hinge element lying in the recess having a member lying in the groove, the hinge element being secured to the non-metallic member.

12. An ophthalmic mounting comprising a non-metallic member having a previously formed recess in one face, the recess having a wall provided with a previously formed groove, and a hinge element lying in the recess having a side resting against the wall and a member lying in the groove, the hinge element being secured to the non-metallic member.

In testimony thereof, I have hereunto subscribed my name this 1st day of August, 1921.

FREDERICK A. STEVENS.